(12) United States Patent
Vander Putten et al.

(10) Patent No.: US 10,345,134 B2
(45) Date of Patent: Jul. 9, 2019

(54) STORAGE TANK HAVING AN ACTIVE SUPPORT ROD MEASUREMENT SYSTEM

(71) Applicant: AvtechTyee, Inc., Everett, WA (US)

(72) Inventors: Ken Vander Putten, Everett, WA (US); Dan Moore, Everett, WA (US); Todd Bolduc, Everett, WA (US)

(73) Assignee: AVTECHTYEE, INC., Everett, WA (US)

( * ) Notice: Subject to any disclaimer, the term of this patent is extended or adjusted under 35 U.S.C. 154(b) by 429 days.

(21) Appl. No.: 14/725,910

(22) Filed: May 29, 2015

(65) Prior Publication Data

US 2015/0346014 A1 Dec. 3, 2015

Related U.S. Application Data

(60) Provisional application No. 62/004,585, filed on May 29, 2014.

(51) Int. Cl.
*G01F 23/20* (2006.01)
*G01F 23/00* (2006.01)
*G01G 19/414* (2006.01)
*G01G 17/04* (2006.01)

(52) U.S. Cl.
CPC .......... *G01F 23/20* (2013.01); *G01F 23/0076* (2013.01); *G01G 17/04* (2013.01); *G01G 19/414* (2013.01)

(58) Field of Classification Search
CPC ...... G01G 17/04; G01G 19/414; G01F 23/20; G01F 23/0076
See application file for complete search history.

(56) References Cited

U.S. PATENT DOCUMENTS

| 3,583,352 | A | * | 6/1971 | Alleaume | ............... F17C 13/08 114/74 A |
| 4,872,120 | A | | 10/1989 | Orloff et al. | |
| 5,133,212 | A | * | 7/1992 | Grills | .................. G01F 23/0076 177/136 |
| 5,228,340 | A | | 7/1993 | Kataoka et al. | |
| 5,368,636 | A | | 11/1994 | Ashton et al. | |
| 5,606,515 | A | | 2/1997 | Mockapetris et al. | |
| 5,850,757 | A | * | 12/1998 | Wierenga | ................ G01F 23/20 177/245 |

(Continued)

FOREIGN PATENT DOCUMENTS

GB 1 537 913 A 1/1979
GB 2 290 141 A 12/1995

(Continued)

OTHER PUBLICATIONS

European Search Report issued in European Patent Application No. 158004737.4 dated Mar. 8, 2018.

(Continued)

*Primary Examiner* — Xin Y Zhong
(74) *Attorney, Agent, or Firm* — BakerHostetler

(57) ABSTRACT

A measurement system for a tank includes a tank configured to contain material, a plurality of support rods to support the tank and each of the plurality of support mechanisms including a load measurement sensor. The system further including a weight measurement circuit configured to determine an amount of material contained in the tank in response to the load measurement sensor.

19 Claims, 10 Drawing Sheets

(56) References Cited

U.S. PATENT DOCUMENTS

| | | |
|---|---|---|
| 6,226,807 B1 | 5/2001 | Rozenblatt et al. |
| 6,360,617 B1 | 3/2002 | Chapman |
| 6,725,165 B1 * | 4/2004 | Knox ............... B60N 2/002 |
| | | 177/144 |
| 6,787,713 B2 | 9/2004 | Kuechenmeister et al. |
| 6,931,926 B1 | 8/2005 | Van |
| 8,354,602 B2 * | 1/2013 | Lucas ............. G01G 23/3735 |
| | | 177/132 |
| 2004/0079150 A1 * | 4/2004 | Breed ............... B60J 10/00 |
| | | 73/291 |
| 2006/0142974 A1 | 6/2006 | Scott et al. |
| 2011/0174551 A1 | 7/2011 | Lucas et al. |
| 2014/0117163 A1 | 5/2014 | Simpson |

FOREIGN PATENT DOCUMENTS

| | | |
|---|---|---|
| JP | 91-2443 | 2/1991 |
| JP | 3006545 U | 1/1995 |
| JP | 9-68453 A | 3/1997 |
| JP | 2006-123575 A | 5/2006 |
| WO | 02/06594 A1 | 1/2002 |

OTHER PUBLICATIONS

Office Action issued in Japanese Patent Application No. 2017-515022, dated Oct. 18, 2018.

\* cited by examiner

STORAGE TANK HAVING AN ACTIVE SUPPORT ROD MEASUREMENT SYSTEM

CROSS REFERENCE TO PRIOR APPLICATIONS

This application claims the benefit from U.S. Provisional Application No. 62/004,585 filed on May 29, 2014, which is hereby incorporated by reference for all purposes as if fully set forth herein.

BACKGROUND OF THE DISCLOSURE

1. Field of the Disclosure

This disclosure is directed to storage tanks having active measurement systems, and particularly to storage tanks having active measurement systems associated with support mechanisms.

2. Related Art

Numerous types of tanks exist that are configured to store liquid and/or solid materials. For such tanks, it is beneficial to know if the tank is approaching its capacity. Historically, an obtrusive system has been utilized whereby holes were drilled in the tanks, probes and sensors were inserted, and electronics were attached. This type of system has typically been plagued with failures due to the probes and sensors getting fowled, thereby causing erroneous readings and premature shut down of the tanks. To combat this, engineers have installed multiple sensors for redundancy reasons in case one of the sensors failed or became fowled. Additionally, engineers have also put elaborate wash nozzles in the tanks that clean the sensors. Finally, last but not least, the maintenance of the system is not easy or time efficient due to the location of the sensors and associated material in the tank. Even these systems are still subject to frequent failure.

One type of tank measurement system that has been plagued with failures due to the probes and sensors getting fowled, thereby causing erroneous readings and premature shut down, is the use of measurement systems for tanks that store lavatory waste from the lavatories on aircraft. Such tanks have an increased probability of failing or becoming fowled from the lavatory waste. The previously described elaborate wash nozzles in the tank that clean the sensors additionally waste heavy water that the aircraft has to carry. Moreover, maintenance of the system is not sanitary because it involves contact with lavatory waste. Finally, lavatory functionality is critical in commercial aircraft in order to address passenger convenience, comfort, and the like. In this regard, an aircraft lavatory that is erroneously indicating a full tank presents an undesirable situation for aircraft passengers and aircraft operators.

Accordingly, there is a need for a tank measurement system that is more accurate, more reliable, and has lower maintenance. Moreover, there is a need for a tank measurement system used in conjunction with lavatories in aircraft that have a higher availability for passenger comfort and convenience.

SUMMARY OF THE DISCLOSURE

According to an aspect of the disclosure, a measurement system for a tank including a tank configured to contain material, a plurality of support mechanisms to support the tank, each of the plurality of support mechanisms including a load measurement sensor, and a weight measurement circuit configured to determine an amount of material contained in the tank in response to the load measurement sensor.

According to an aspect of the disclosure, a measurement process for a tank includes arranging a tank configured to contain material, arranging a plurality of support mechanisms to support the tank, arranging, with each of the plurality of support mechanisms, a load measurement sensor, and determining an amount of material contained in the tank in response to the load measurement sensor.

The disclosed system is an unobtrusive one. When the disclosed system is utilized in aircraft, the system may be incorporated into rods or other support mechanisms that hold the tank in the aircraft or in other machines, facilities and locations. The tank may hang from the rods within the fuselage of the aircraft. Each of these support mechanisms may generate an output signal proportional to the weight of the tank. As the aircraft banks or turns the force vector on each of the rods may vary accordingly. Electronics may analyze the rod output signals and determine a content level based on the results. If one rod fails, a software algorithm may compensate. No holes for sensors need to be drilled into the tank; and all the measurements may be generated externally via the mounting method used in the aircraft.

This invention is equally applicable to other applications such as potable drinking water tanks, gray water tanks, cargo weight measurement, load and balance measurement, flight test instrumentation measurement, and the like. The invention further reduces or eliminates maintenance delays due to improperly functioning sensor inputs. Finally, the tank may have a simpler construction with fewer access holes, the tank may thus be manufactured at a lower cost, and the system may have a higher reliability.

Additional features, advantages, and aspects of the disclosure may be set forth or apparent from consideration of the following detailed description, drawings, and claims. Moreover, it is to be understood that both the foregoing summary of the disclosure and the following detailed description are exemplary and intended to provide further explanation without limiting the scope of the disclosure as claimed.

BRIEF DESCRIPTION OF THE DRAWINGS

The accompanying drawings, which are included to provide a further understanding of the disclosure, are incorporated in and constitute a part of this specification, illustrate aspects of the disclosure and together with the detailed description serve to explain the principles of the disclosure. No attempt is made to show structural details of the disclosure in more detail than may be necessary for a fundamental understanding of the disclosure and the various ways in which it may be practiced. In the drawings.

DETAILED DESCRIPTION OF THE DISCLOSURE

Figure 1:
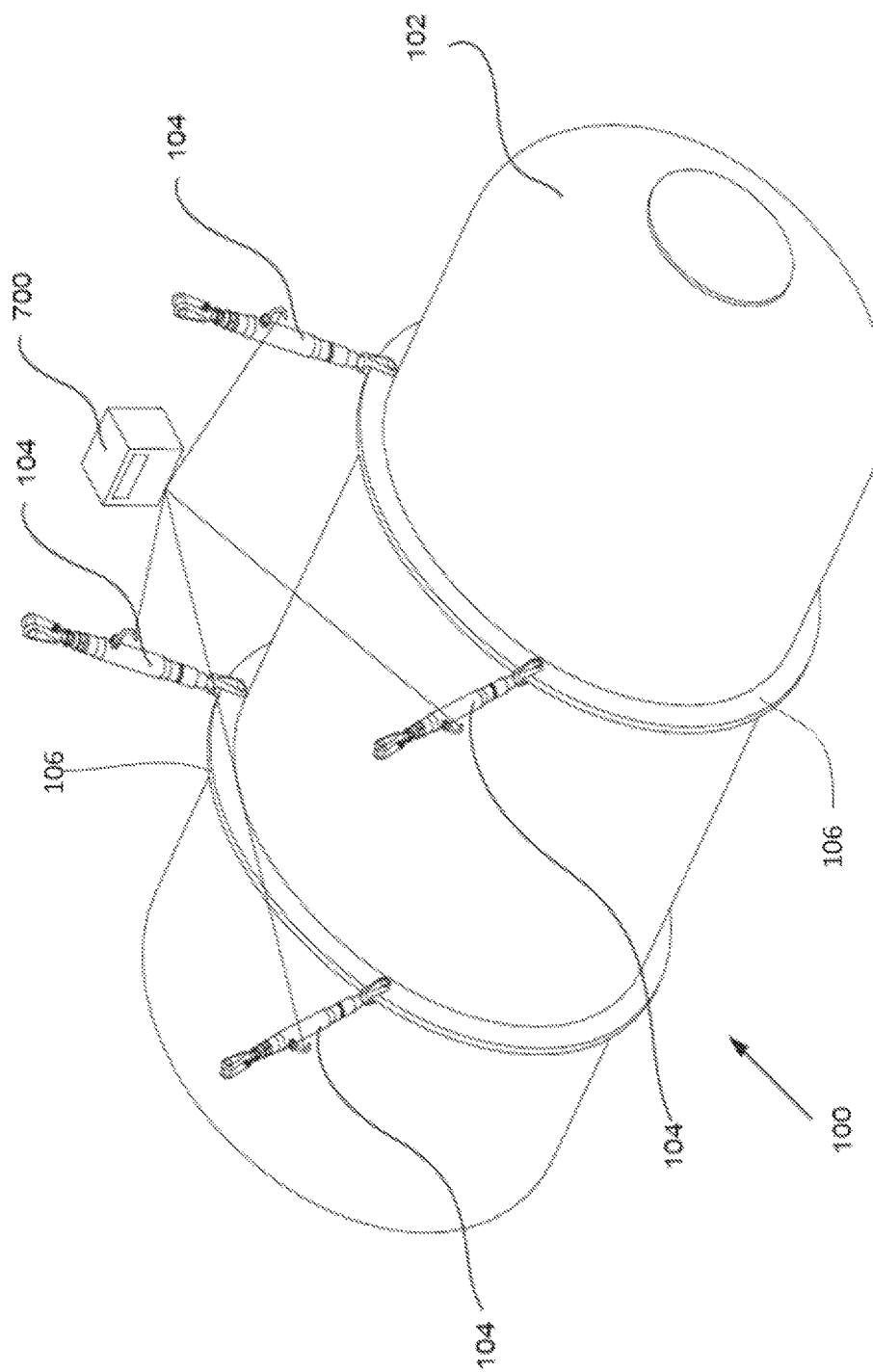
FIG. 1 shows a tank measurement system constructed according to the principles of the disclosure.

The aspects of the disclosure and the various features and advantageous details thereof are explained more fully with reference to the non-limiting aspects and examples that are described and/or illustrated in the accompanying drawings and detailed in the following description. It should be noted that the features illustrated in the drawings are not necessarily drawn to scale, and features of one aspect may be employed with other aspects as the skilled artisan would recognize, even if not explicitly stated herein. Descriptions of well-known components and processing techniques may be omitted so as to not unnecessarily obscure the aspects of the disclosure. The examples used herein are intended merely to facilitate an understanding of ways in which the disclosure may be practiced and to further enable those of skill in the art to practice the aspects of the disclosure. Accordingly, the examples and aspects herein should not be construed as limiting the scope of the disclosure, which is defined solely by the appended claims and applicable law. Moreover, it is noted that like reference numerals represent similar parts throughout the several views of the drawings.

FIG. 1 shows a tank measurement system constructed according to the principles of the disclosure. In particular, FIG. 1 shows a measurement system 100. The use of the disclosed measurement system 100 within a lavatory is merely exemplary. Numerous other systems are contemplated and may utilize the teachings of the disclosure herein for other aircraft applications. Moreover, other non-aircraft applications are contemplated as well. The measurement system 100 may be used in any application in which it may be useful to manage the weight and contents of the tank.

Further shown in FIG. 1, the measurement system 100 may include a tank 102. The tank 102 may be supported within an aircraft by a number of support mechanisms such as support rods 104. Four support rods 104 are shown in FIG. 1. However, any number of support rods 104 may be utilized. Additionally, other types of support mechanisms, such as cradles (see FIG. 8, cradles 800), beams 902 (see FIG. 9, beams 902) and the like, may be utilized. The tank 102 may also include an input (not shown) to receive material along with a number of other components to fully implement a tank 102 within an aircraft. When implemented in conjunction with an aircraft lavatory, the input may receive lavatory waste. In one aspect, the tank 102 may have one or more flanges 106, which may be used to support the tank 102 in various orientations and may be used for the connection of support mechanisms like the support rods 104 to the tank 102. However, the tank 102 may be supported by the support mechanisms in other ways.

In the context of airplane use, the tank 102 may be accessed from the exterior of an airplane. Ground personnel may access and service the tank 102 via a panel under the fuselage (not shown) of an airplane (not shown). In other configurations, the ground personnel may access and service the tank 102 within the fuselage (not shown) of the airplane (not shown).

A measurement circuit 700 (described in more detail in FIG. 7) may be connected or operatively linked to each of the support mechanisms such as the support rods 104. The measurement circuit 700 may include a load assembly (FIG. 2, load cell 206) capable of measuring a weight of the tank 102.

Figure 2:
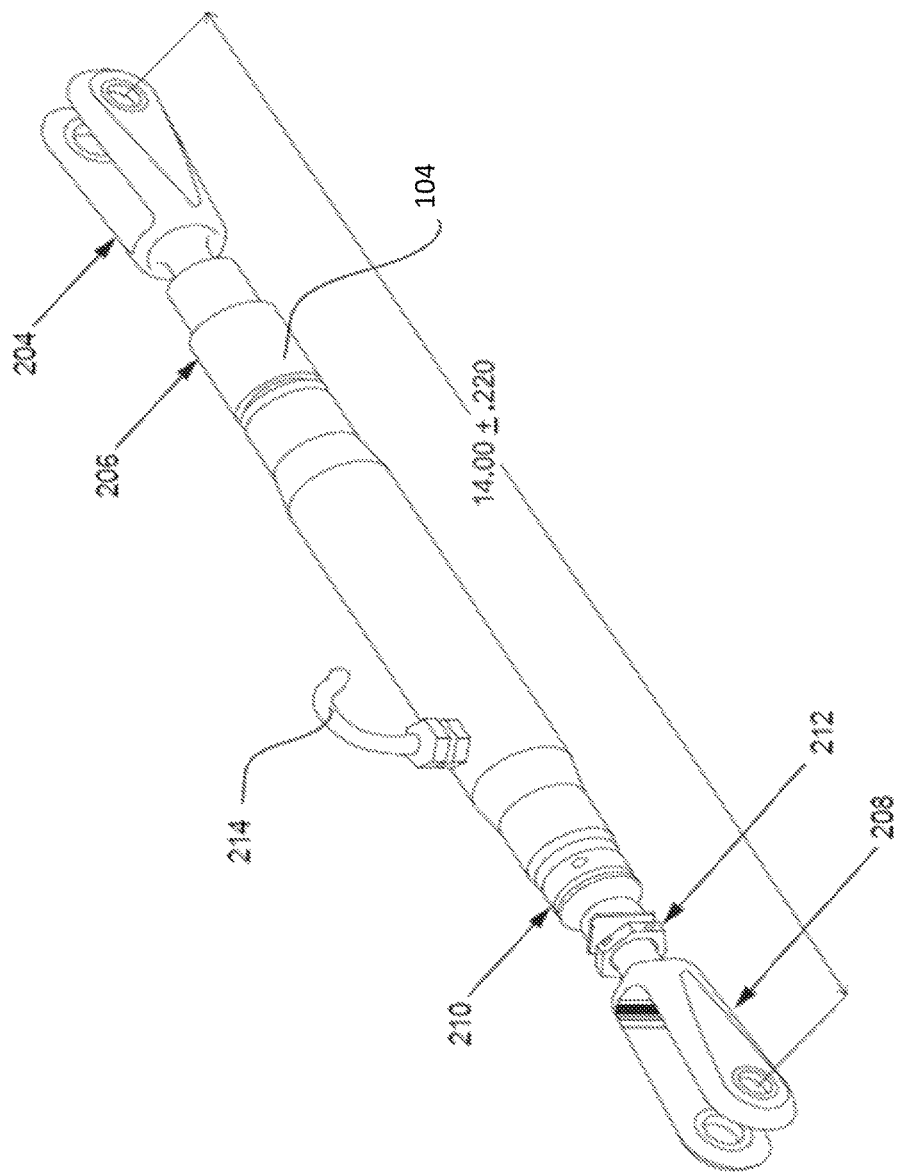
FIG. 2 shows a support rod according to the principles of the disclosure.

FIG. 2 shows a support rod 104 according to the principles of the disclosure. In particular, FIG. 2 shows a support rod 104, which may be one of the support mechanisms used to support the tank 102. The support rod 104 may include an adjustable clevis assembly 208 and a fixed clevis assembly 204. One of the adjustable clevis assemblies 208 and fixed clevis assemblies 204 may connect to the tank 102 shown in FIG. 1, and the other one of the adjustable clevis assemblies 208 and fixed clevis assemblies 204 may connect to aircraft structure to support the tank 102. The support mechanism such as the support rod 104 may be attached to the tank 102 at the flange 106.

The support rod 104 may be constructed with various dimensions, materials, and the like. In one aspect, the support rod 104 may be 1.0 inch in diameter and have a 0.083 inch thick wall. Additionally, in one aspect the support rod 104 may be constructed from aluminum. In particular, the support rod 104 may be constructed from aluminum 2024-T3 H/T to −T42 after swagging. The support rod 104 may include MBS10-11 primer with one coat on the inside diameter portion and two coats on the outside diameter portion. Moreover, the support rod 104 may be approximately 14 inches in length. Other implementations of the support rod 104 are contemplated as well.

The support rod 104 may further include a load cell assembly 206 or other form of transducer configured to measure the load exerted on the support rod 104, such as the load of the tank 102. Load cell assemblies 206 can be implemented with a number of different technologies including hydraulic, pneumatic, strain gauge, or the like. Although reference is made to a load cell, it is further contemplated that the measurement of load within the support rod 104 may be accomplished by any type of sensor including a strain gauge and the like. Other examples of measurement instruments may include force sensors and transducers, piezo transducers and washers, force-measuring bearings, journals, rollers, and the like. Additionally, although the sensor is shown as being part of the support rod 104, other locations are contemplated for the sensor as well. Other support mechanisms for the tank 102 may also employ one or more of such measurement instruments.

The output of the load cell 206 may be transmitted through a sensor cable 214. The sensor cable 214 may also provide power to the load cell assembly 206. The sensor cable 214 may provide additional functionality as well. Alternatively or additionally, the output of the load cell simply 206 may be transmitted wirelessly or wired on a communication channel as defined herein.

The support rod 104 may further include a swivel assembly 210 to allow the adjustable clevis assembly 208 to rotate with respect to the support rod 104. The support rod 104 may further include one or more mechanical fasteners 212. In one aspect, the mechanical fasteners 212 may include NAS1193K7 and NAS1423C7 components that may include one or more hex nuts, locking components and washers.

Figure 3:
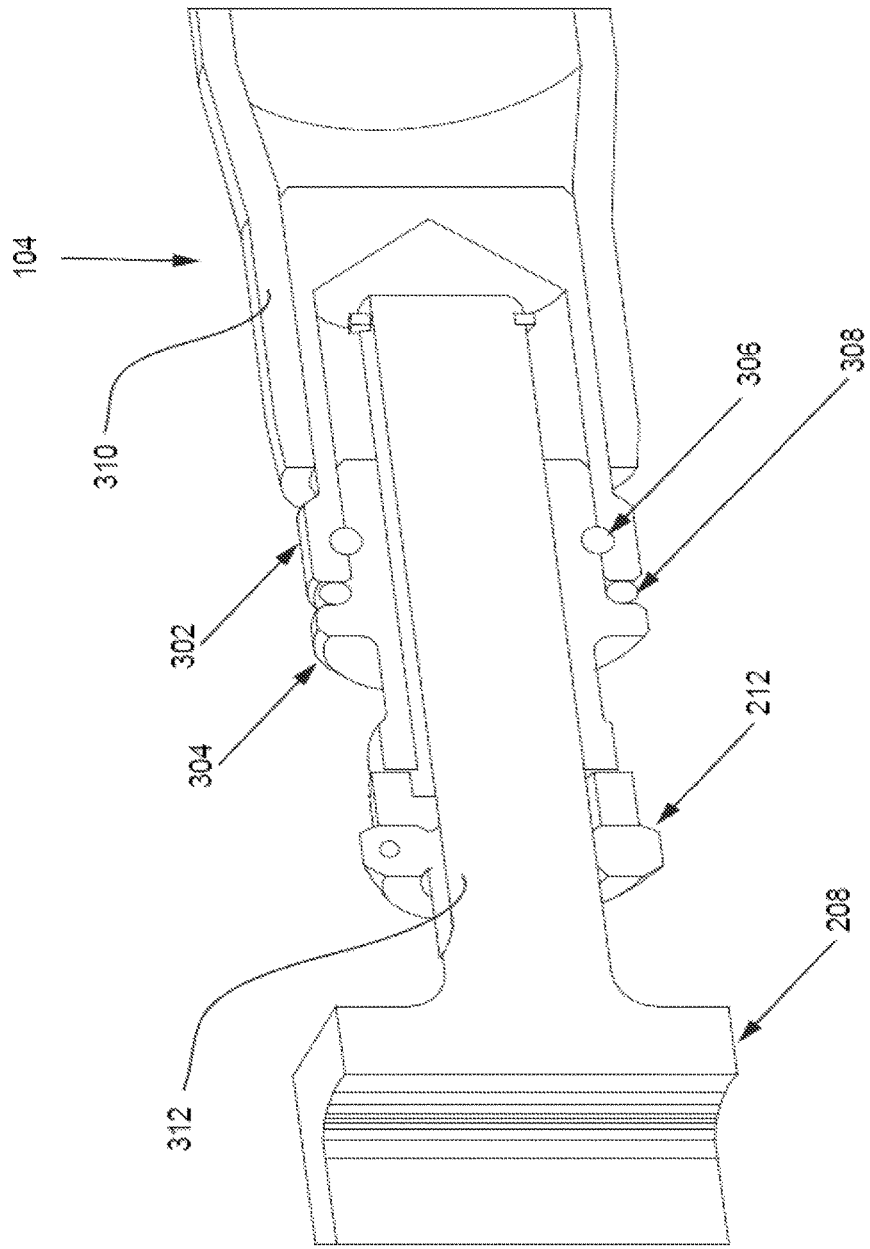
FIG. 3 shows details of the support rod according FIG. 2.

FIG. 3 shows details of one aspect of the support rod 104 according FIG. 2. In particular, the support rod 104 may in one aspect include a rod portion 312 connected to the adjustable clevis assembly 208. The rod portion 312 may extend into a rod housing 314. The rod portion 312 may further include a retaining ring 310. Moreover, the rod housing 314 may include a female swivel insert 302 that receives a male swivel insert 304. A swivel wire 306 may be arranged between the female swivel insert 302 and the male swivel insert 304. Additionally, an O-ring 308 may be arranged between the female swivel insert 302 and the male swivel insert 304. This construction allows the support rod 104 to connect to the adjustable clevis assembly 208 in a secure manner and transmit the tension or compression load from the tank 102 through the support rod 104.

Figure 4:
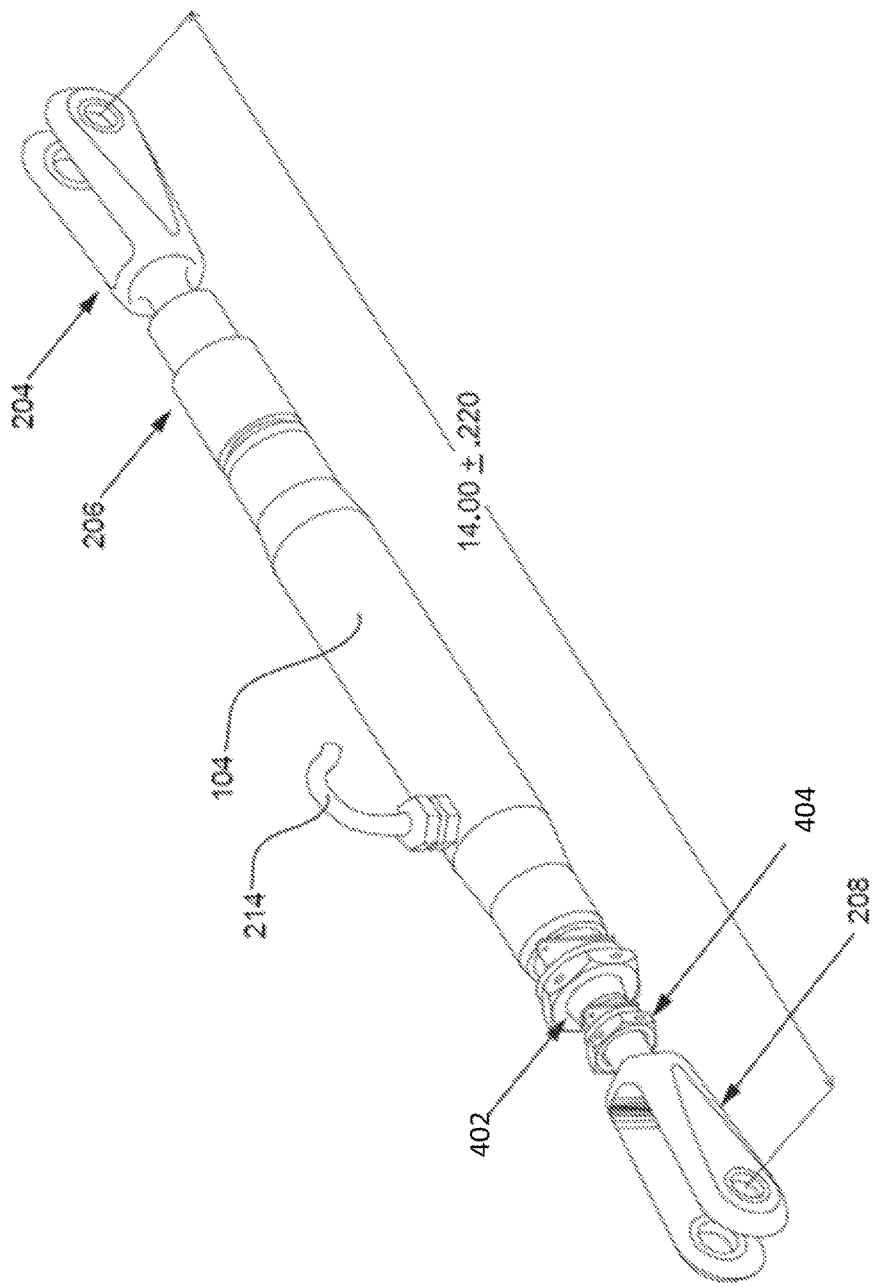
FIG. 4 shows another support rod according to the principles of the disclosure.

FIG. 4 shows another support rod 104 according to the principles of the disclosure. In particular, the support rod 104 shown in FIG. 4 may include a Vernier adjustment insert 402 along with mechanical fasteners 404. The mechanical fasteners 404 may include NAS1193K9 and NAS1423C9 fasteners. NAS1193K9 and NAS1423C9 fasteners may include serrated washers, hex nuts, bolts, and the like.

Figure 5:
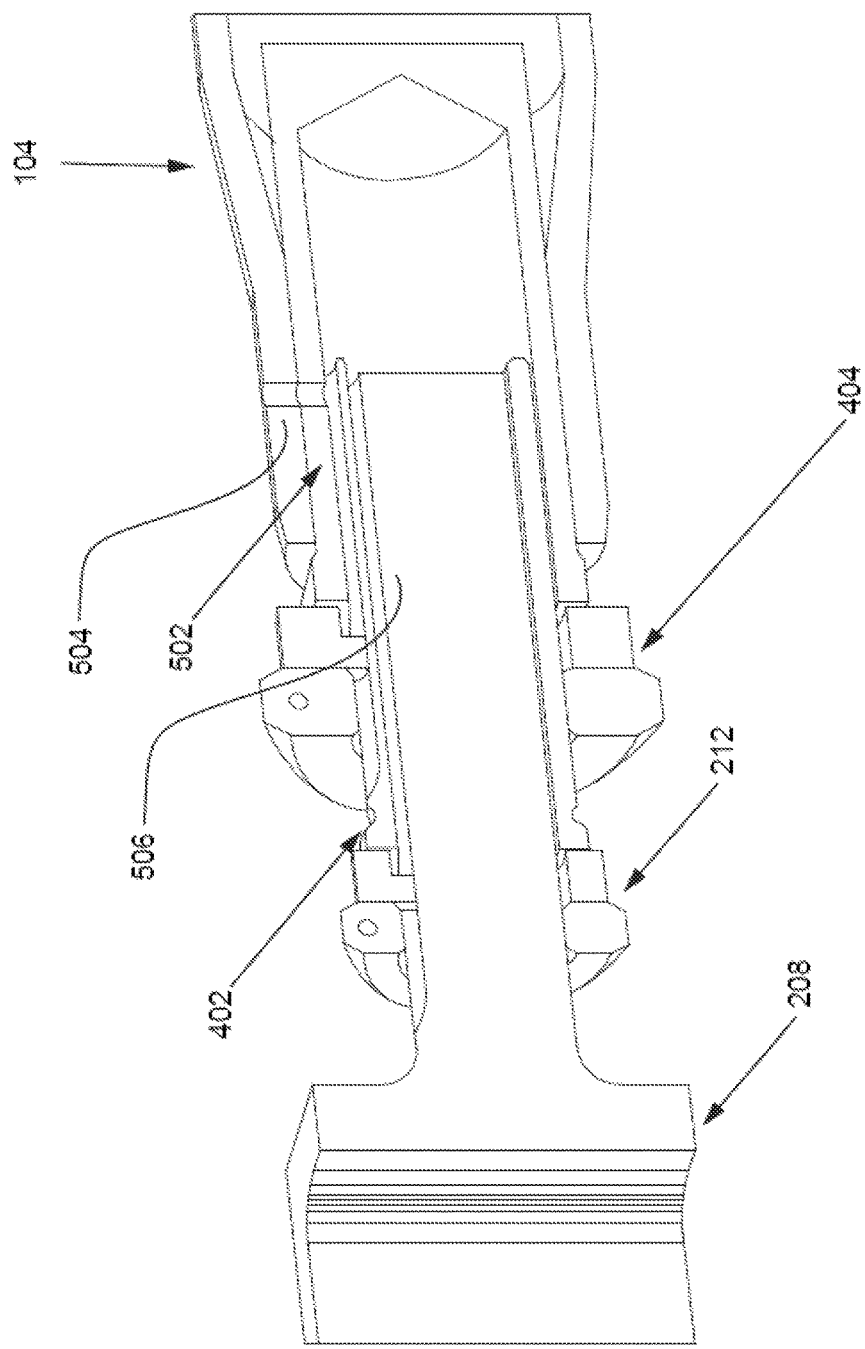
FIG. 5 shows details of the support rod according to FIG. 4.

FIG. 5 shows details of the support rod 104 according to FIG. 4. In particular, FIG. 5 shows a rod housing 504 receiving a threaded insert 502. The threaded insert 502 further receives a rod 506 that is arranged within the Vernier insert 402. The mechanical fasteners 212 and 404 may help maintain the rod 506 with respect to the rod housing 504. This construction allows the support rod 104 to connect to the adjustable clevis assembly 208 in a secure manner and transmit the tension or compression load from the tank 102 through the support rod 104.

Figure 6:
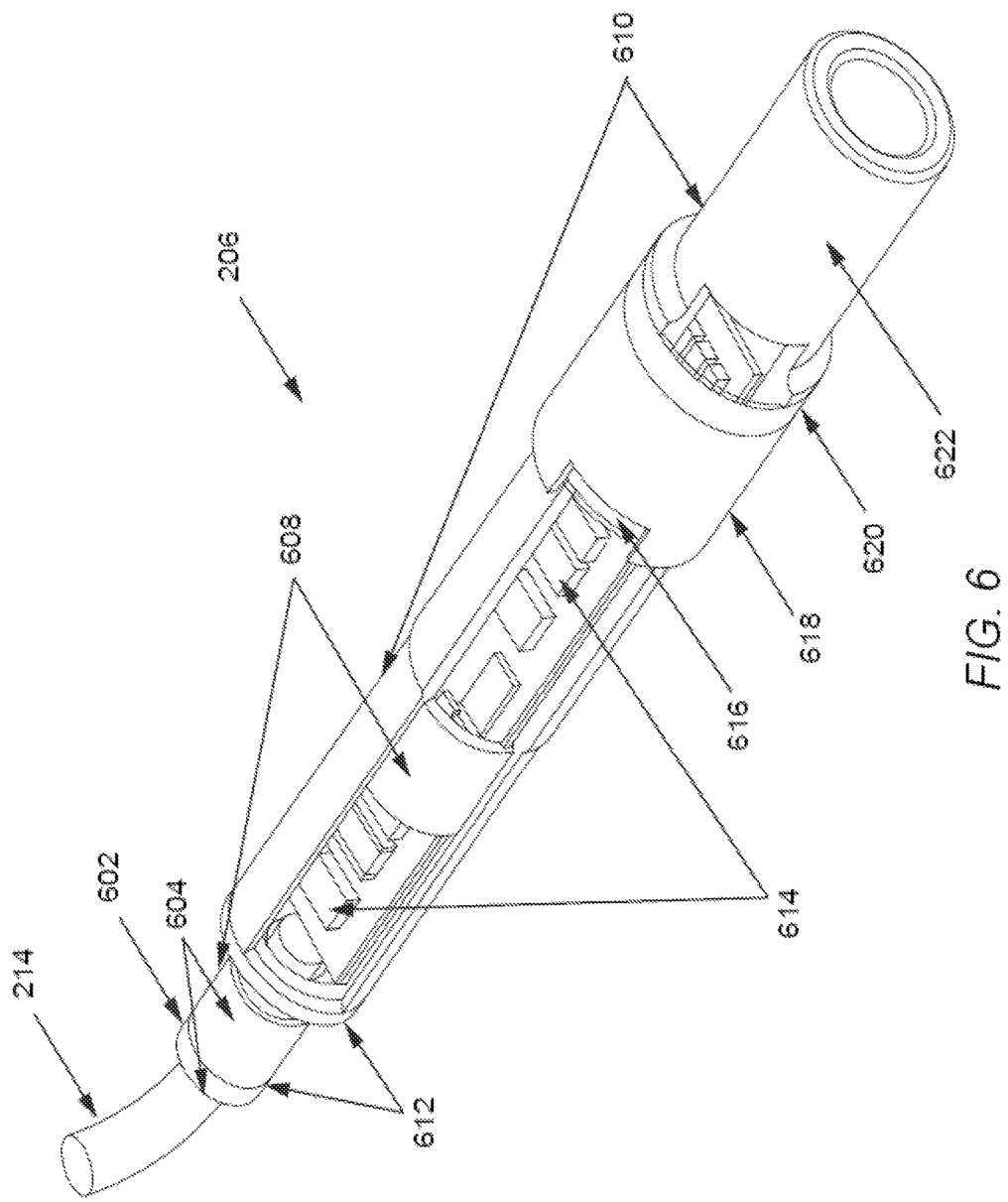
FIG. 6 shows a cutaway view of a load cell according to the principles of the disclosure.

FIG. 6 shows a cutaway view of a load cell 206 according to the principles of the disclosure. In particular, the load cell 206 may include the cable 214 providing power to the load cell 206 and receiving load signals from the load cell 206. The cable 214 may include a tube crimp 602 and a strain relief assembly 604 to maintain the cable 214 in an operative manner with respect to the load cell 206. The load cell 206 may further include a housing 610 connecting to the strain relief assembly 604. The strain relief assembly 604 may include a laser welded portion 612 to connect to the housing 610. Alternatively or additionally the housing 610 may be laser welded closed to provide a hermetically sealed construction. The load cell 206 may further include a printed circuit board 614 arranged within the housing. The printed circuit board 614 may receive signals from the bad cell 206, provide power to the bad cell 206, provide signal conditioning to the bad cell 206, and the like. The housing 610 may further include an O-ring 616 to hermetically seal various components within the bad cell 206. The O-ring 616 may be constructed from a phosphate ester-based fluid resistant material. The bad cell 206 may further include a cover 618 to provide further protection for the components therein. The cover 618 may include a laser welded portion 620 to connect to the housing 610. Additionally, the housing 610 may include a unique serial number indicia 622 for identification purposes. Finally, the bad cell 206 may include cap portions 608 to further hermetically seal the same.

Figure 7:
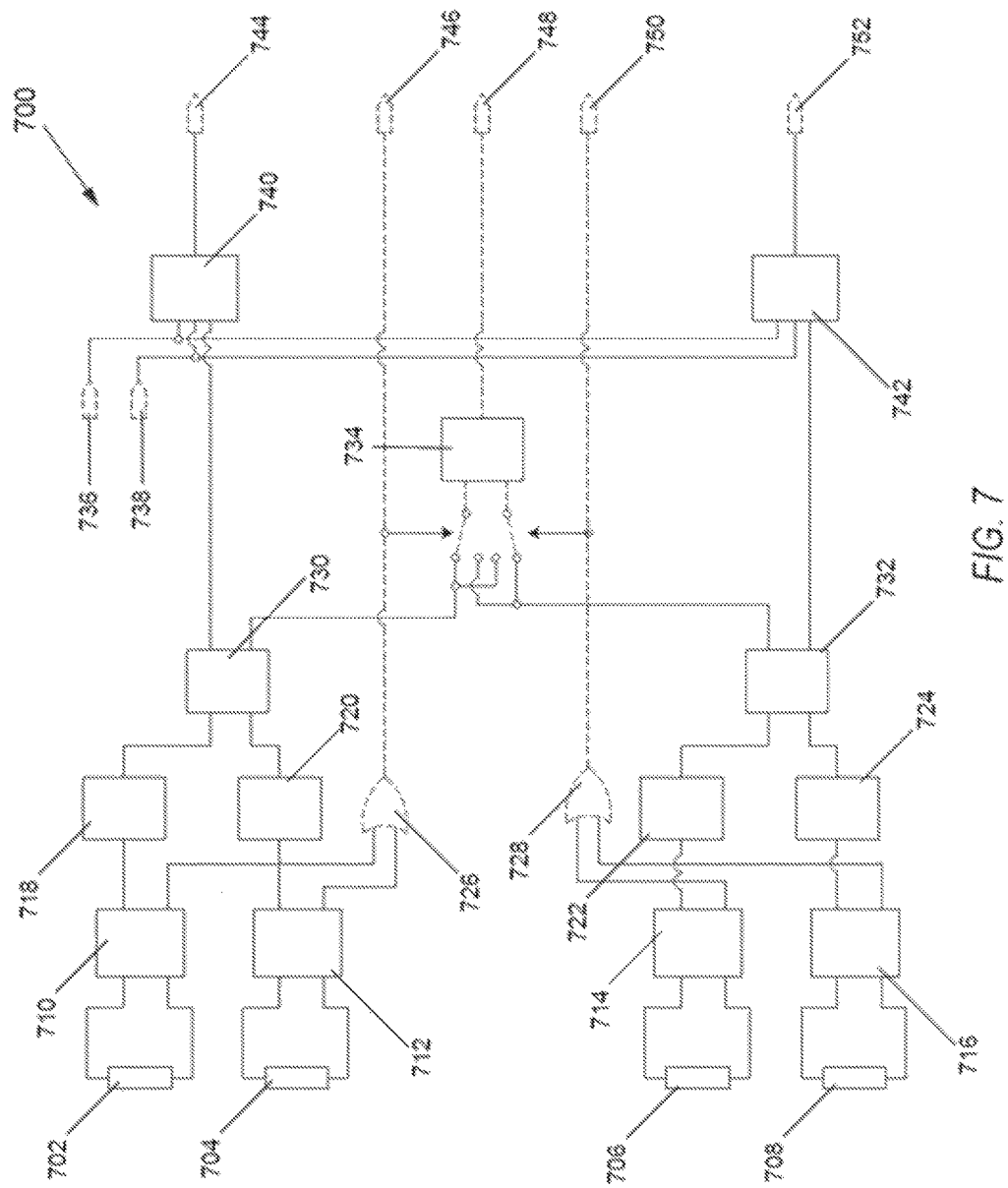
FIG. 7 shows a measurement circuit according to principles of the disclosure.

FIG. 7 shows a measurement circuit 700 according to principles of the disclosure. In particular, the measurement circuit 700 may include a connection to each of the bad cells 206 associated with each of the support rods 104 such as a forward left sensor 702, a forward right sensor 704, an aft left sensor 706, and an aft right sensor 708. The forward left sensor 702 may include a sensor conditioner 710, the forward right sensor 704 may include a sensor conditioner 712, the aft left sensor 706 may include a sensor conditioner 714, and the aft right sensor 708 may include a sensor conditioner 716. Each of the sensor conditioners 710, 712, 714, and 716 provide excitation to the sensors 702, 704, 706, and 708, input protection, and gain. A conditioned output may be provided that represents an axial force present on the rod 104. The sensor conditioners 710, 712, 714, and 716 may be configured to change a signal for sensors 702, 704, 706, and 708 by converting those signals from analog to digital.

A BITE sensor status check may be generated for OPEN, SHORTED, and out of bounds conditions by each of the sensor conditioners 710, 712, 714, and 716. The output of the BITE sensor status check may be logically evaluated in an OR gate 726, 728 and output to indicate a forward sensor fault 746 or aft sensor fault 750 respectively. The forward sensor fault 746 or the aft sensor fault 750 may be communicated over a communication channel.

The sensor conditioners 710, 712, 714, and 716 may output a sensor output to a low pass filter 718, 720, 722, and 724. The low pass filter 718, 720, 722, and 724 may strip off higher frequency interference signals from a rod force vector, providing a signal representative of the tank weight.

Thereafter, the output of the low pass filters 718, 720 may be input to a summing circuit 730, and the output of low pass filters 722, 724 may be input to a summing circuit 732. The summing circuits 730, 732 may sum right and left side weight signals to form the final sensed weight of the tank 102.

The output of the summing circuit 730 may be input to a comparator 740 and compared to a tank size input 736 and a fill limit value 738. In this regard, the sensed tank weight is compared against the configured tank size 736, and configured fill limit 738. An output may be generated when the tank 102 is full based on tank size 736 and fill limit 738. In particular, the result of the comparator 740 when the output of the summing circuit 730 exceeds the fill limit 738, may be a tank full signal 744. The tank full signal 744 may be communicated over a communication channel.

Likewise, the output of the summing circuit 732 may be input to a comparator 742 and compared to the tank size input 736 and the fill limit value 738. The result of the comparator 742 when the output of the summing circuit 732 exceeds the fill limit 738, may be a tank full signal 752.

An output of the summing circuit 730 and the summing circuit 732 may additionally be input to an averaging circuit 734. The forward and aft weight signals may be averaged to provide a continuous tank level signal for display on the maintenance panel. If the forward or aft sensor is detected faulty, the average block only uses the weight signal from the good sensor. The resulting average generated by the averaging circuit 734 may be output to provide a tank level 748. The tank level signal 748 may be communicated over a communication channel. The averaging circuit 734 may be further configured to compensate for forces generated by aircraft maneuvering. Alternatively, the measurement circuit 700 may be configured to cancel and/or compensate for forces generated by aircraft maneuvering. Such aircraft maneuvering may increase force on one or more sensors.

The measurement circuit 700 may also account for errors in one or more of the sensors 702, 704, 706, and 708. If any sensor 702, 704, 706, or 708 fails, the measurement circuit 700 may use the output of any functioning sensor 702, 704, 706, or 708 by multiplying that output to determine an approximate value for each sensor 702, 704, 706, and 708. For example, if forward left sensor 702 fails, the summing circuit 730 might only receive an input from the forward right sensor 704. The failure of forward left sensor 702 may then result in the average of the forward right sensor 704, the aft left sensor 706, and the aft right sensor 708 readings being applied as if the average of the functioning sensors 704, 706, and 708 were a function of all of the sensors 702, 704, 706, and 708. Error correction can also be performed as explained in relation to the digital circuitry shown in FIG. 10.

The measurement circuit 700 may also be implemented in a number of different ways. For example, the measurement circuit 700 may be implemented with a processor, computing device, dedicated hardware, communication channel, and/or software. If utilized with a processor, computing device, dedicated hardware, communication channel, and/or software, the measurement circuit 700 may include analog to digital converters to generate a digital signal for processing by the same.

Figure 8:
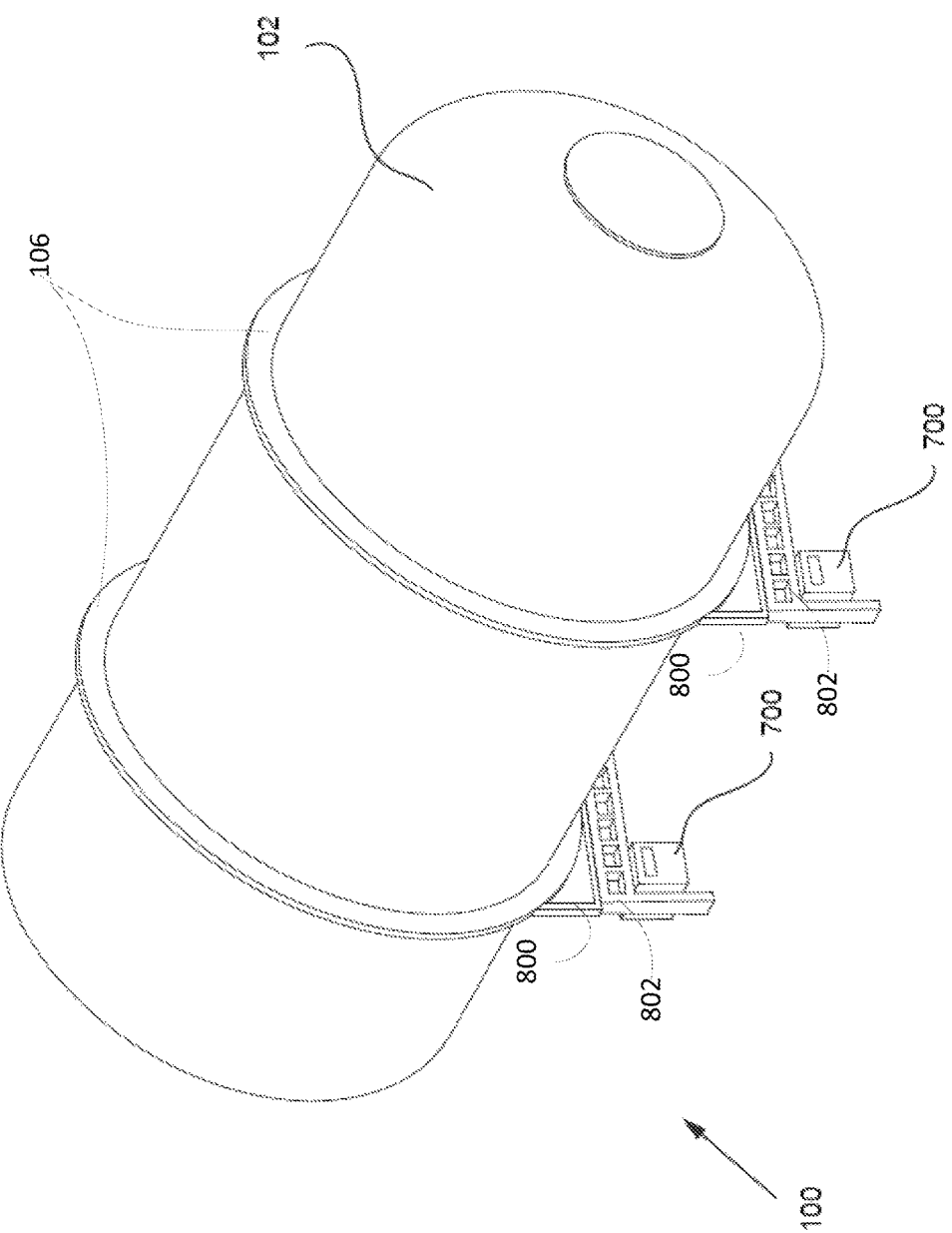
FIG. 8 shows a tank arranged with a cradle mounting arrangement according to principles of the disclosure.

FIG. 8 illustrates a cradle configuration for holding the tank 102. In such an aspect, the tank 102 may be held by one or more support beams 802 extending laterally underneath the surface of the tank 102. When the tank 102 is arranged horizontally with one or more support beams 802 extending laterally underneath a bottom surface of the tank 102, a support mechanism such as a cradle bracket 800 may be used to attach the tank 102 to each of the support beams 802. The cradle bracket 800 may be metal, plastic, or some other material, and may be curved as the shape of the outer surface of the tank 102 so that the tank 102 may fit securely into the cradle bracket 800. A cradle bracket 800 may extend underneath the tank 102 from one side of the tank 102 to another, or multiple cradle brackets 800 may be used so that there may be a cradle bracket 800 for each support beam 802 on multiple sides of the tank 102 resting on the support beam 802. For example, each support beam 802 may use two cradle brackets 800—one to secure each side of the tank 102 (e.g., a left side and a right side).

To attach the cradle bracket 800 to the tank 102 and to the support beam 802, the cradle bracket 800 may be arranged to fit around the flange 106 of the tank 102 so that the flange 106 sits on the cradle bracket 800, and the cradle bracket 800 sits on the support beam 802. The cradle bracket 800 may be connected with fasteners, such as, rivets, bolts, screws, or the like (not shown) to both the support beam 802 and the tank 102. In one example, the cradle bracket 800 may be connected to the flange 106 of the tank 102 as the flange 106 rests on the cradle bracket 800. The measurement circuit 700, or portion thereof, may be attached to the cradle bracket 800, the support beam 802, arranged between the cradle bracket 800 and the tank 102, and/or the tank 102. The sensors 702, 704, 706, and 708 may be arranged within the measurement circuit 700, on one or more of the cradle brackets 800, on the tank 102, the support beam 802, a location between any of these components, and/or the like.

Figure 9:
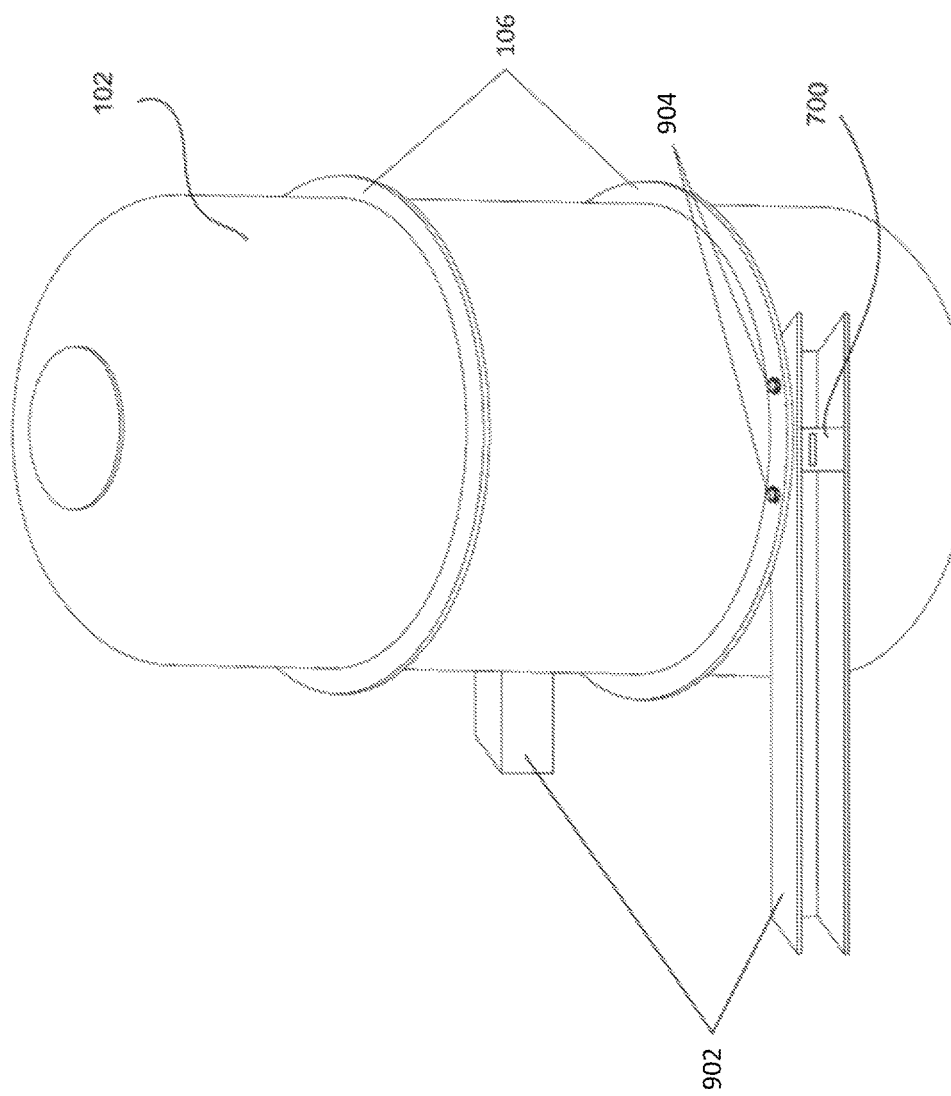
FIG. 9 shows a tank arranged with a flange mounting arrangement according to principles of the disclosure.

FIG. 9 illustrates a tank installation using a flange mount 904 as a support mechanism. The flange 106 of the tank 102 may connect to one or more beams 902 such as an I-beam. The beams 902 may be arranged tangential to the tank 102 so that the flange 106 of the tank 102 may rest on the beam 902 in enough locations to support the tank 102. In one example, beams 902 may be arranged parallel to one another with the tank 102 in between the beams 902, and the tank 102 arranged so that the flange 106 makes contact on opposite sides of the tank 102 with the beams 902. The flange 106 may be connected to the beam with fasteners, such as, rivets, bolts, screws, or the like, forming a flange mount 904.

In another example, additional beams (not shown) may be arranged perpendicular to the parallel beams 902 so that the perpendicular beams may support the flange 106 on a side of the tank 102 in between the parallel beams 902. In such an arrangement, the additional perpendicular beams may form a "T" shape with each of the parallel beams 902 so that the tank 102 may have additional beams on which to set the flange 106 for support. The flange 106 may be bolted or otherwise attached to the beams 902 in places where the flange 106 makes contact with the beams 902. The measurement circuit 700, or portion thereof, may be arranged on a beam 902, the flange 106, and/or elsewhere on the tank 102. One or more sensors 702, 704, 706, and 708 may be arranged on a bolt, screw, or the like attaching the flange 106 to the beam 902, on the tank 102, on the beam 902, between any of these components, within the measurement circuit 700 and/or the like.

Figure 10:
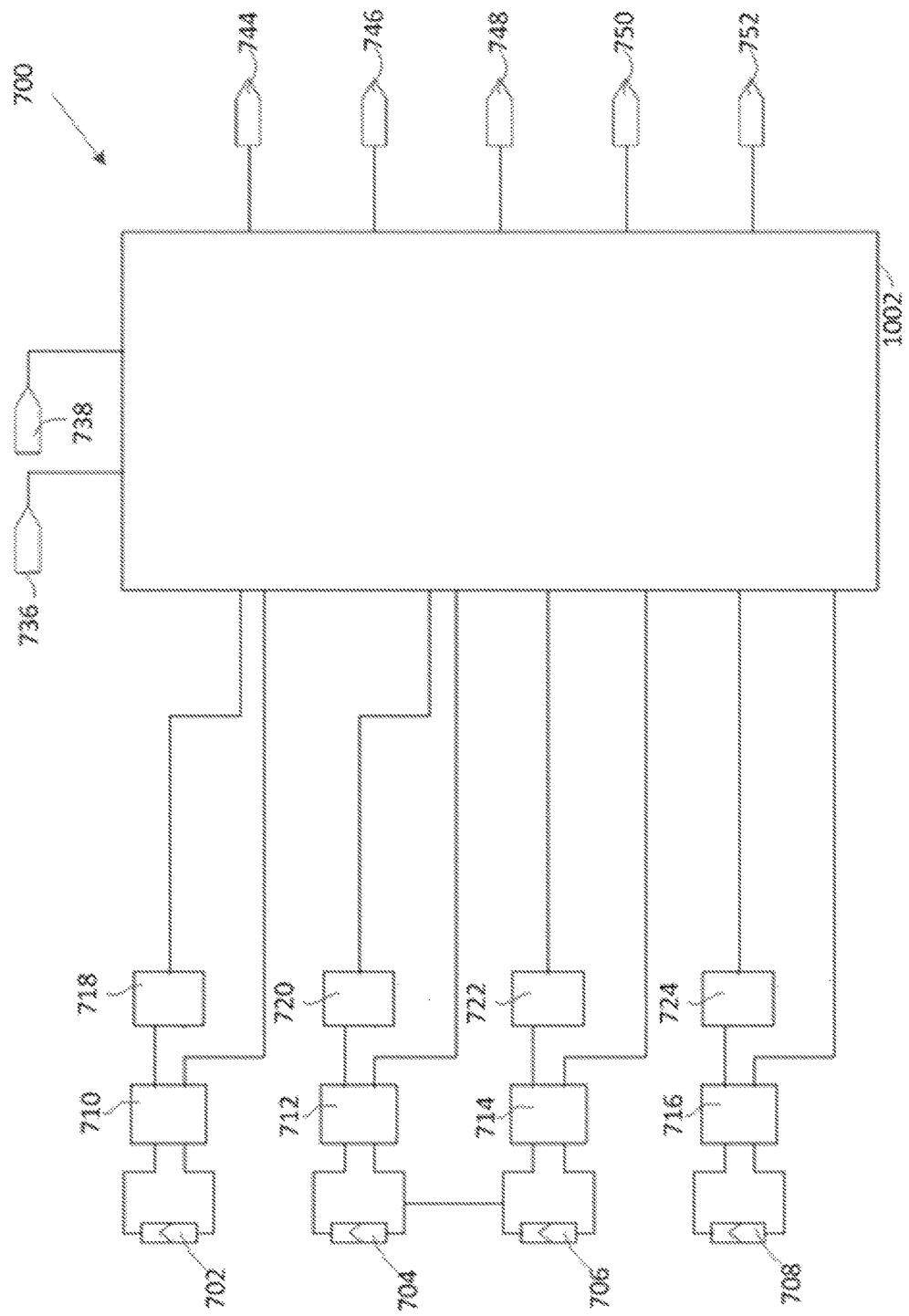
FIG. 10 shows a measurement circuit with a digital processor according to principles of the disclosure.

FIG. 10 illustrates digital circuitry that may be used for the measurement circuit 700. As in FIG. 7, the measurement circuit 700 may produce filtered outputs of the forward left sensor 702, the forward right sensor 704, the aft left sensor 706, and the aft right sensor 708. Each sensor output may be conditioned by the respective sensor conditioner 710, 712, 714, and 716 and filtered with low-pass filters 718, 720, 722, and 724. A BITE sensor status check may be generated for OPEN, SHORTED, and out of bounds conditions by each of the sensor conditioners 710, 712, 714, and 716. The output of the BITE sensor status check may be output to a microprocessor 1002, which may determine whether there has been a fault and may indicate a fault if a fault exists. Faults may include a tank full fault 744 and/or 752, a forward sensor fault 746, a tank level fault 748, an aft sensor fault 750, and the like.

The output signals from the low-pass filters 718, 720, 722, and 724 may also be transmitted to the microprocessor 1002. Based on inputs such as tank size 736 and fill limit 738, and the like, in combination with received inputs from the low-pass filters 718, 720, 722, and 724, the microprocessor 1002 may determine the sum of the forward sensors 702 and 704 readings, the sum of the aft sensors 706 and 708 readings, and may average those sums to determine and output the tank level 748. The microprocessor 1002 may also be configured to determine, based on the sum of the forward sensors 702 and 704 readings and on the sum of the aft sensors 706 and 708 readings, whether the tank 102 is full, and may output a tank full 744 and/or 752 notification. If the microprocessor 1002 determines that the BITE status outputs from sensor conditioners 710, 712, 714, and 716 indicate a sensor failure, the microprocessor 1002 may indicate a corresponding forward sensor fault 746 and/or an aft sensor fault 750.

The microprocessor 1002 may be configured to cancel and/or compensate for forces generated by aircraft maneuvering. Such aircraft maneuvering may increase force on one or more sensors.

In the case of a sensor fault, the microprocessor 1002 may determine the sum and average of proper sensor readings and multiply them to assign the received value or values as if they were based on all of the sensor readings being proper. For example, if forward left sensor 702 were to fail, the microprocessor 1002 may indicate a forward sensor fault 746 and may determine the sum and average based on the other sensor 704, 706, and 708 readings. In comparison with the tank size 736 and fill limit 738 inputs, the microprocessor 1002 may determine whether the tank 102 is full 744 and/or 752 and what the tank level 748 is. In this way, the measurement circuit 700 may properly operate even if one or more sensors 702, 704, 706, and 708 are not properly functioning.

As described above, the disclosed system is unobtrusive. When the disclosed system is utilized in an aircraft, the system may be incorporated into rods 104 and/or other support mechanisms that may hold the tank 102 in the aircraft. The tank 102 may hang from the rods 104 that may be attached to the fuselage of the aircraft or may be supported by a cradle bracket 800 and/or beams 902. Each of these rods 104 may generate an output signal proportional to the weight of the tank 102. As the aircraft banks or turns the force vector on each of the rods 104 may vary accordingly. The electronics may analyze the rod 104 output signals and determine a liquid level based on the results taking into account the variable force applied by aircraft maneuvering. If one rod 104 fails, a software algorithm may compensate. Holes for sensors need not be drilled into the tank 102; and all the measurements may be done externally via the mounting method used in the aircraft.

The measurement system is applicable to aircraft lavatory storage tanks 102. As further described above, the disclosed system is equally applicable to other applications such as potable drinking water measurement, gray water measurement, cargo weight measurement, load and balance measurement, flight test instrumentation measurement, and the like. The disclosed system further reduces or eliminates maintenance delays due to improperly functioning sensor inputs. Finally, the tank 102 may be simpler with fewer access holes, the tank may be manufactured at a lower cost, and the system may have a higher reliability.

The invention may include communication channels that may be any type of wired or wireless electronic communications network, such as, e.g., a wired/wireless local area network (LAN), a wired/wireless personal area network (PAN), a wired/wireless home area network (HAN), a wired/wireless wide area network (WAN), a campus network, a metropolitan network, an enterprise private network, a virtual private network (VPN), an internetwork, a backbone network (BBN), a global area network (GAN), the Internet, an intranet, an extranet, an overlay network, a cellular telephone network, a Personal Communications Service (PCS), using known protocols such as the Global System for Mobile Communications (GSM), CDMA (Code-Division Multiple Access), W-CDMA (Wideband Code-Division Multiple Access), Wireless Fidelity (Wi-Fi), Bluetooth, and/or the like, and/or a combination of two or more thereof.

The invention may be implemented in any type of computing devices, such as, e.g., a desktop computer, personal computer, a laptop/mobile computer, a personal data assistant (PDA), a mobile phone, a tablet computer, cloud computing device, and the like, with wired/wireless communications capabilities via the communication channels.

Further in accordance with various aspects of the invention, the methods described herein are intended for operation with dedicated hardware implementations including, but not limited to, PCs, PDAs, semiconductors, application specific integrated circuits (ASIC), programmable logic arrays, cloud computing devices, FPGAs and other hardware devices constructed to implement the methods described herein.

It should also be noted that the software implementations of the invention as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to email or other self-contained information archive or set of archives is considered a distribution medium equivalent to a tangible storage medium. Accordingly, the invention is considered to include a tangible storage medium or distribution medium, as listed herein and including art-recognized equivalents and successor media, in which the software implementations herein are stored.

While the disclosure has been described in terms of exemplary aspects, those skilled in the art will recognize that the disclosure can be practiced with modifications in the spirit and scope of the appended claims. These examples given above are merely illustrative and are not meant to be an exhaustive list of all possible designs, aspects, applications or modifications of the disclosure.

What is claimed is:

1. A measurement system for an aircraft storage tank comprising:
a tank configured to contain material received from an aircraft system;
a plurality of support mechanisms configured to support the tank within an aircraft, each of the plurality of support mechanisms comprising a support rod;
each of the plurality of support mechanisms including a load measurement sensor; and
a weight measurement circuit configured to determine an amount of material contained in the tank in response to the load measurement sensors,
wherein the weight measurement circuit comprises a plurality of sensor conditioners, a low pass filter for each load measurement sensor configured to remove higher frequency signals output from the sensor conditioner, a summing circuit for each pair of the plurality of sensor conditioners, a comparator for each of the summing circuits, and an averaging circuit responsive to the summing circuits;
wherein each signal conditioner is configured to output a built-in test equipment (BITE) status signal, the BITE status signal indicating a faulty load measurement sensor; and
wherein the weight measurement circuit is further configured to compensate for the faulty load measurement sensor.

2. The measurement system according to claim 1 wherein each of the plurality of support mechanisms comprises one of a plurality of support rods and each of the plurality support rods having a first connection assembly and a second connection assembly;
wherein the tank is configured to be mechanically connected to the plurality support rods by respective ones of the first connection assembly and hang from and vertically below the plurality of support rods;
wherein the plurality support rods are configured to connect to an aircraft structure by respective ones of the second connection assembly.

3. The measurement system of claim 1, wherein the weight measurement circuit comprises:
a processor configured to determine sensor faults from the BITE status signal, a tank level from the filtered signal, and that the tank is full from the filtered signal.

4. The measurement system according to claim 1 wherein the summing circuits comprise a first summing circuit configured to sum signals from a first group of the load measurement sensors; and the summing circuits comprise a second summing circuit configured to sum signals from a second group of the load measurement sensors.

5. The measurement system according to claim 1 wherein each of the plurality of support mechanisms comprises one of a plurality of support rods and each of the plurality support rods having a first connection assembly and a second connection assembly;
wherein the tank is configured to be mechanically connected to the plurality support rods by respective ones of the first connection assembly and hang from and vertically below the plurality of support rods;

wherein the first connection assembly and the second connection assembly each comprise a clevis; and wherein the weight measurement circuit is configured to output a tank full signal, a load measurement sensor fault signal, and a tank level signal.

6. The measurement system according to claim 2 wherein the load measurement sensor is arranged in each of the plurality support rods between the first connection assembly and the second connection assembly; and wherein the sensor conditioner is configured to provide excitation to the load measurement sensor, input protection to the load measurement sensor, and gain for the load measurement sensor.

7. The measurement system according to claim 2 wherein the load measurement sensor is arranged in each of the plurality support rods between the first connection assembly and the second connection assembly;

wherein the weight measurement circuit comprises a plurality of sensor conditioners;

wherein the weight measurement circuit comprises a processor.

8. The measurement system according to claim 1 wherein the weight measurement circuit outputs a tank level signal in response to an output from the averaging circuit.

9. The measurement system according to claim 1 wherein the tank is configured to hang from and vertically below the plurality of support mechanisms, wherein the load measurement sensor comprises a load cell arranged in each of the support rods.

10. The measurement system according to claim 1 wherein the tank is configured to hang from and vertically below the plurality of support mechanisms; and wherein the load measurement sensor comprises a strain gauge arranged in each of the support rods.

11. The measurement system according to claim 8 further comprising a wireless network;

wherein the wireless network is configured to generate a wireless communication channel between each load measurement sensor and the weight measurement circuit; and wherein the tank is arranged in the aircraft and the averaging circuit compensates for forces associated with aircraft maneuvering.

12. The measurement system according to claim 1 further comprising a wireless network;

wherein the wireless network is configured to generate a wireless communication channel between each load measurement sensor and the weight measurement circuit.

13. The measurement system according to claim 2 wherein the first connection assembly and the second connection assembly each comprise a clevis;

wherein the weight measurement circuit comprises a plurality of sensor conditioners;

wherein the tank comprises a lavatory tank.

14. The measurement system according to claim 1 further comprising a wireless network;

wherein the wireless network is configured to generate a wireless communication channel between each load measurement sensor and the weight measurement circuit; and wherein the tank comprises an aircraft lavatory tank.

15. The measurement system according to claim 9 wherein each of the plurality of support mechanisms comprise a clevis to connect to the tank and a clevis to connect to an aircraft.

16. An aircraft system comprising the measurement system of claim 1 and further comprising a wireless network;

wherein the wireless network is configured to generate a wireless communication channel between each load measurement sensor and the weight measurement circuit; and wherein the tank comprises an aircraft lavatory tank.

17. The measurement system of claim 2, further comprising a wireless network;

wherein the wireless network is configured to generate a wireless communication channel between each load measurement sensor and the weight measurement circuit.

18. A measurement process for a tank arranged in an aircraft configured to receive material comprising:

arranging a tank configured to contain material within the aircraft;

arranging a plurality of support mechanisms to support the tank within the aircraft;

arranging, with each of the plurality of support mechanisms, a load measurement sensor;

conditioning an output signal from each load measurement sensor of each of the plurality of support mechanisms with a signal conditioner;

determining a faulty load measurement sensor in response to a built-in test equipment (BITE) status signal from the signal conditioner;

determining an amount of material contained in the tank in response to the load measurement sensor that compensates for the faulty load measurement sensor; and outputting a signal when it is determined that the amount of material contained in the tank has reached a determined amount.

19. The measurement process of claim 18, wherein the determining the amount of material contained in the tank in response to the load measurement sensor comprises compensating for changes in forces associated with aircraft maneuvering; and wherein the outputting the signal comprises outputting the signal over a wireless network configured to generate a wireless communication channel between each load measurement sensor and a weight measurement circuit.

* * * * *